United States Patent [19]
Becker

[11] Patent Number: 5,246,373
[45] Date of Patent: Sep. 21, 1993

[54] EDUCATIONAL BOARD GAME APPARATUS

[76] Inventor: Stella S. Becker, 1209 Afton Drive, Sarnia, Ontario, Canada, N7S 5A4

[21] Appl. No.: 950,146

[22] Filed: Sep. 24, 1992

[51] Int. Cl.⁵ .......................................... G09B 19/22
[52] U.S. Cl. ................................ 434/129; 273/239; 273/430; 273/289
[58] Field of Search ............... 434/129, 128; 273/239, 273/236, 242, 243, 430, 288, 289, 290

[56] References Cited

U.S. PATENT DOCUMENTS

| | | | |
|---|---|---|---|
| 2,444,517 | 7/1948 | Levy | 273/289 |
| 4,326,720 | 4/1982 | Erlich | 273/239 |
| 4,714,255 | 12/1987 | Henry et al. | 273/249 |
| 4,889,344 | 12/1989 | Zimba | 434/167 X |

Primary Examiner—John J. Wilson
Assistant Examiner—Jeffrey A. Smith
Attorney, Agent, or Firm—Leon Gilden

[57] ABSTRACT

A board game arranged to educate and entertain children as to the merits, consequences, and opportunities in dialing assistance is provided. The board game includes a game path having game spaces to indicate selection of cards from various categories, whereupon the answering of such questions permits a player and associated token to proceed along a game path. A player to culminate the travel of the path is declared the winner.

2 Claims, 4 Drawing Sheets

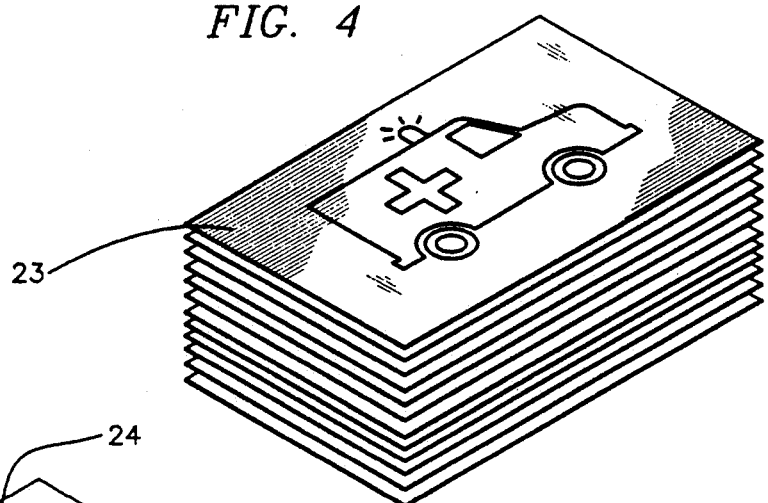
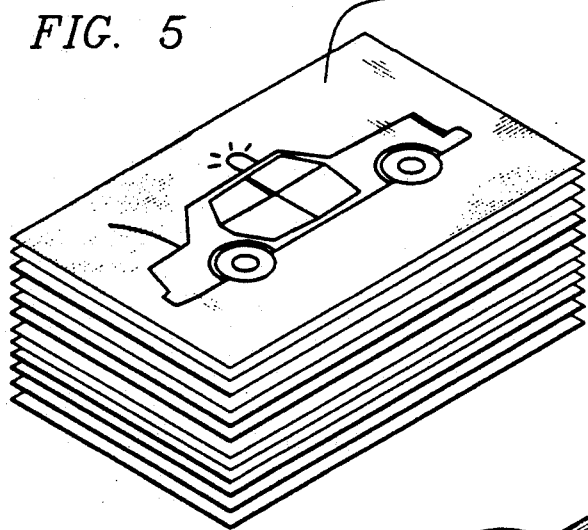
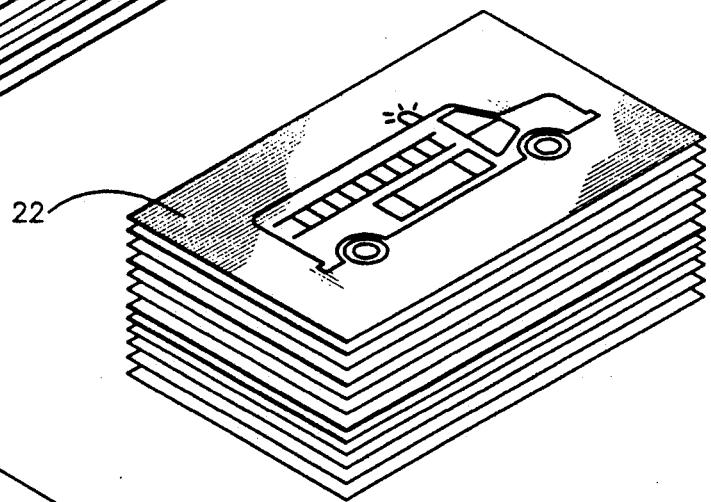
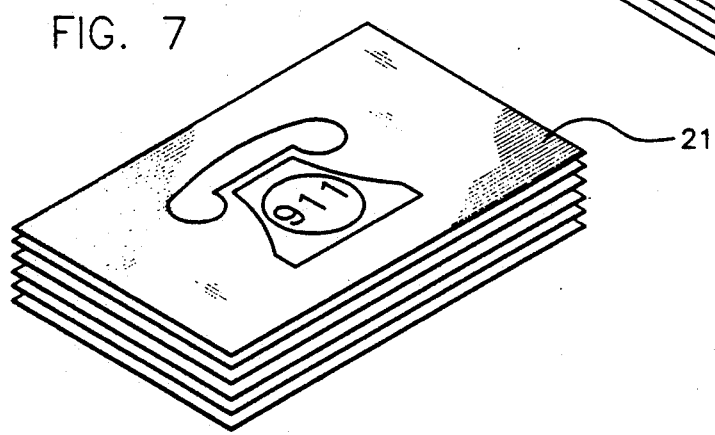

EDUCATIONAL BOARD GAME APPARATUS

BACKGROUND OF THE INVENTION

1. Field of the Invention

The field of invention relates to game board apparatus, and more particularly pertains to a new and improved educational game board apparatus wherein the same is addressed to the education and entertainment relative to emergency dialing situations.

2. Description of the Prior Art

Game board apparatus of various types have been utilized throughout the prior art for education and entertainment of individuals such as exemplified in the U.S. Pat. Nos. 4,991,854; 4,890,844; 3,982,313; 4,984,805; and 4,643,429.

The instant invention attempts to overcome deficiencies in the prior art that have heretofore not addressed the need to educate children as to the merits, consequences, and advantages of dialing 911 and opportunities therefore and in this respect, the present invention substantially fulfills this need.

SUMMARY OF THE INVENTION

In view of the foregoing disadvantages inherent in the known types of board game apparatus now present in the prior art, the present invention provides an educational board game apparatus wherein the same is arranged to direct children and others as to the merits and availability of emergency dialing for emergency assistance. As such, the general purpose of the present invention, which will be described subsequently in greater detail, is to provide a new and improved educational board game apparatus which has all the advantages of the prior art board game apparatus and none of the disadvantages.

To attain this, the present invention provides a board game arranged to educate and entertain children as to the merits, consequences, and opportunities in dialing assistance. The board game includes a game path having game spaces to indicate selection of cards from various categories, whereupon the answering of such questions permits a player and associated token to proceed along a game path. A player to columinate the travel of the path is declared the winner.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved educational board game apparatus which has all the advantages of the prior art board game apparatus and none of the disadvantages.

It is another object of the present invention to provide a new and improved educational board game apparatus which may be easily and efficiently manufactured and marketed.

It is a further object of the present invention to provide a new and improved educational board game apparatus which is of a durable and reliable construction.

An even further object of the present invention is to provide a new and improved educational board game apparatus which is susceptible of a low cost of manufacture with regard to both materials and labor, and which accordingly is then susceptible of low prices of sale to the consuming public, thereby making such educational board game apparatus economically available to the buying public.

Still yet another object of the present invention is to provide a new and improved educational board game apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4, FIG. 5, FIG. 6, and FIG. 7 are isometric illustrations of the decks of various cards utilized in the use of the board game apparatus of the invention.

DESCRIPTION OF THE PREFERRED EMBODIMENT

Figure 1:
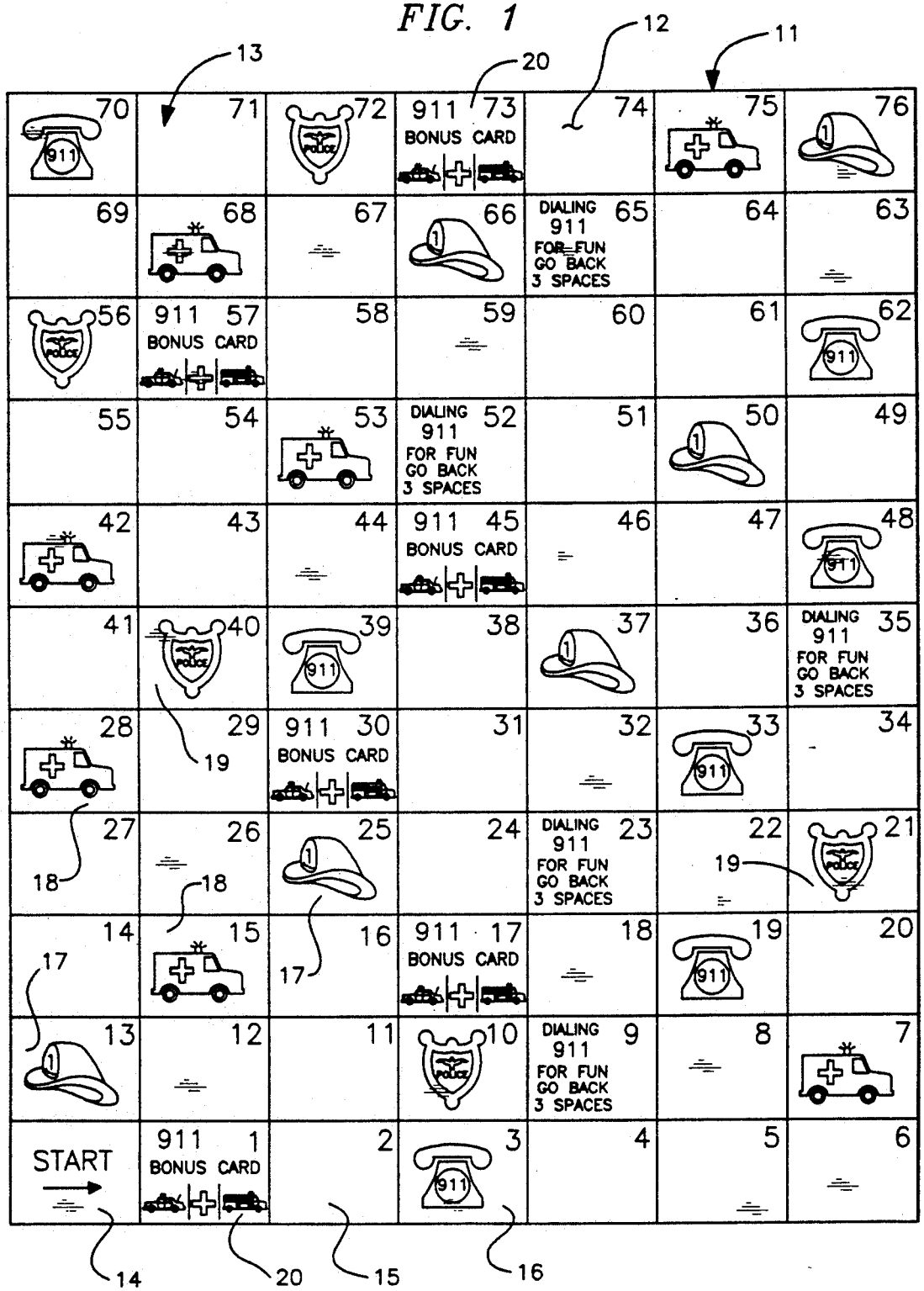
FIG. 1 is an orthographic top view of the game board of the invention.
Figure 2:
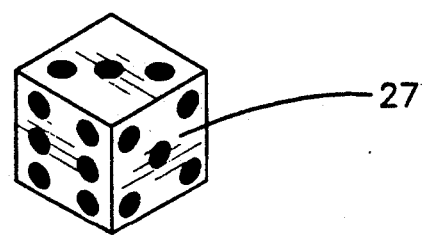
FIG. 2 is an isometric illustration of the dice member utilized by the invention.
Figure 3:
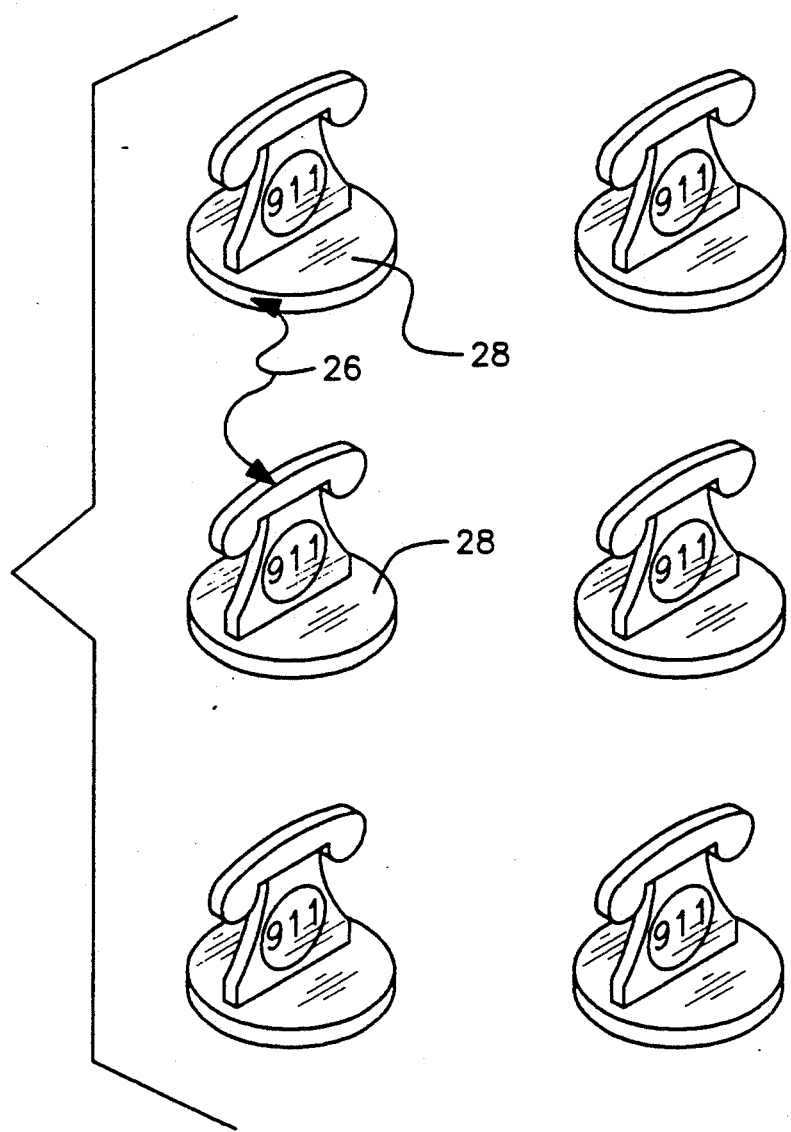
FIG. 3 is an isometric illustration of the token structure utilized by the invention.
Figure 8:
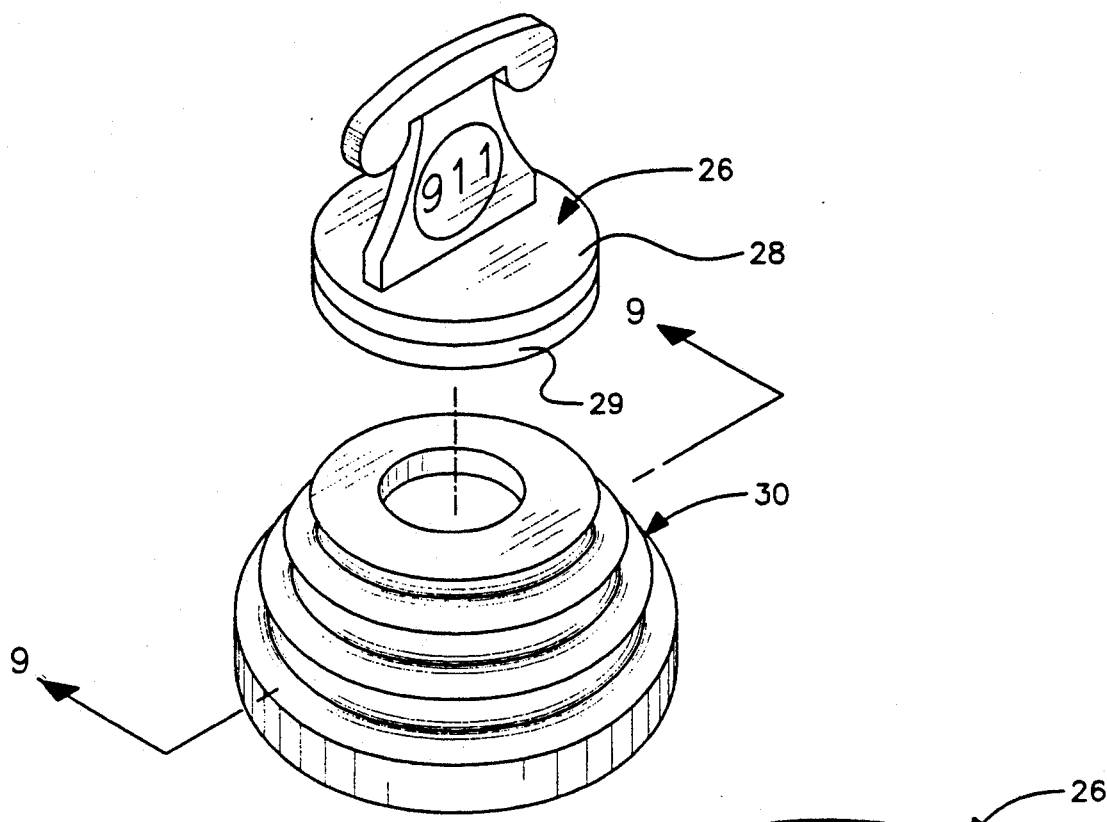
FIG. 8 is an isometric illustration of a modified token structure utilized by the invention.

With reference now to the drawings, and in particular to FIGS. 1 to 9 thereof, a new and improved educational board game apparatus embodying the principles and concepts of the present invention and generally designated by the reference numerals 11-34 will be described.

More specifically, the educational board game apparatus of the instant invention essentially comprises a game board 11 having a top surface 12 formed with a matrix of game spaces 13 coextensive with the top surface of a continuous path configuration, having a start space 14 at a first end of the path, with the game spaces 13 including first category spaces 15 that are blank, second category spaces 16 that direct a player having a token 26 landing upon such a space to draw from a first deck of game cards 21. A third category of spaces 17 direct drawing from a second deck of game cards 22, similarly a fourth category of spaces 18 directing drawing from a third deck of game cards 23, and a fifth category of spaces 19 directing drawing from a fourth deck of game cards 24, as indicated by the FIG. 4-7. The second through fifth category of spaces and the associated first through fourth decks of cards are each arranged to provide for questions to be answered by a player landing upon such a space. The questions are directed to the education of children relative to the advantages and responsibilities in the dialing of an emergency number such as "911". Questions are directed to the providing of information relative to the description of 911, the various telephone exchanges to be served by the dialing of an emergency number, under what circumstances individuals dial such numbers, i.e. crimes in progress, medical emergency, and fire and smoke emergencies (e.g. the second deck of game cards 22 and the associated third category of spaces 17).

Questions are directed to the education of individuals relative to what situations are not deemed to be an emergency, i.e. not requiring immediate response, disturbances such as barking dogs, loud parties, and the like, and such questions are posed in the cards of each of the decks of game cards 21-24. Such questions as how to be prepared for dialing 911, i.e. to describe the nearest traveled intersection, associated home address, and the like is provided. To indicate the seriousness of dialing the emergency number 911, seventh category of spaces 25 are provided, wherein an individual in filing a bogus 911 call is directed to retract a predetermined of spaces, such as three spaces relative to the space 35 of the game path. It should be noted that a sixth category of spaces 20 noted as a "bonus card" space permits an individual to draw a card from any of the decks of game cards 21-24.

A conventional dice member 27 is utilized as a token member to direct individuals to proceed a predetermined number of spaces about the game path of the spaces 13.

Figure 9:
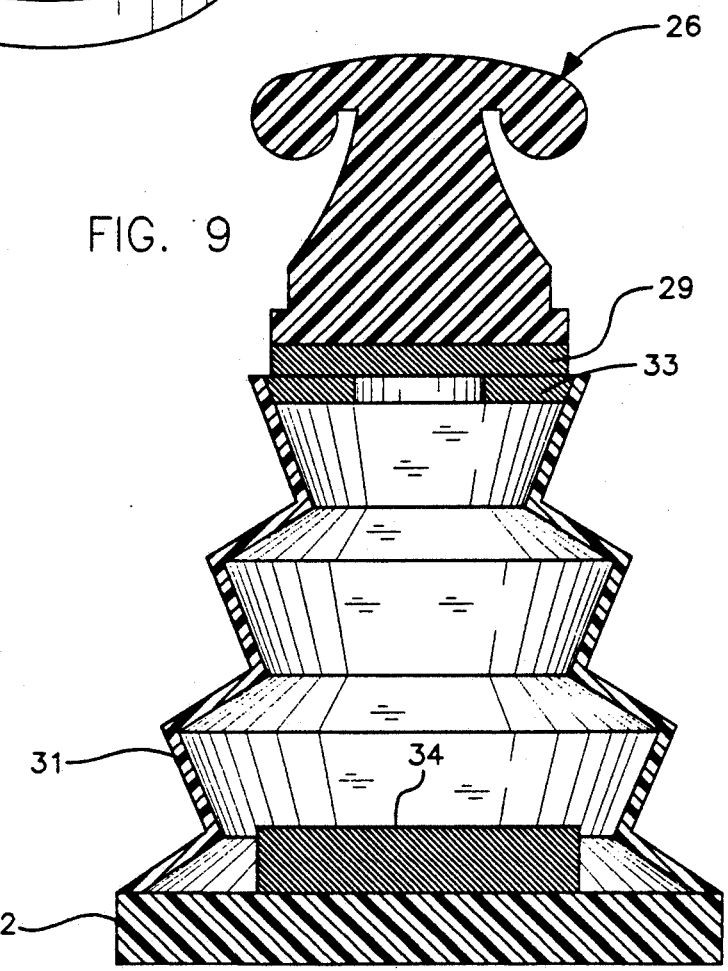
FIG. 9 is an orthographic view, taken along the lines 9—9 of FIG. 8 in the direction indicated by the arrows.

Should a player not be able to answer a question correctly, that player is directed to loose a turn. To emphasize the loss of a turn, individually for effect by children and the like, a modified token structure is indicated in the FIG. 8 and 9. In this manner, the game tokens 26 include a token base 28 having a token base magnetic base 29 mounted to a bottom surface of the token base 28. A token housing 30 is provided having a collapsible bellows side wall 31 formed of shape retentent material that is collapsible in an axially oriented orientation relative to the token housing 30. The bellows includes a bellows base 32 having a base magnetic insert 34 mounted within the housing coaxially aligned relative to the token housing. The base magnetic insert 34 has a top surface in confronting relationship relative to a bellows top wall 33 that is parallel to the insert 34. The top wall 33 is a ferrous metallic material, wherein the magnetic insert 34 is of a second polarity in confronting relationship relative to the metallic top wall 33. The token base magnet base 29 is of a first polarity opposite to that of the second polarity, wherein the first polarity in confronting relationship relative to the top wall 33 to a top surface thereof permits adherence of the magnetic base 29 to the base magnetic insert 34 to insure collapsing of the magnetic base. Upon removal of the token 26, the magnetic attraction of the insert 34 is not sufficient to maintain the bellows in a collapsed orientation when the housing 30 extends to a first position, as indicated in FIG. 9, relative to a second collapsed position when the top wall 33 is in contiguous communication with the insert 34. The housing is thusly collapsed when a player fails to adequately provide an answer and visually, the player indicates a loss of turn, whereupon a player reassuming a turn, the token 26 is merely twisted or pivoted in a roll orientation relative to the top wall 33 and the housing extends to the extended orientation, as indicated in the FIGS. 8 and 9.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An educational board game apparatus, comprising,
a game board, the game board having a top surface, with the top surface including a matrix of game spaces having a continuous path, with the game spaces including a start space, and
a first category of spaces, a second category of spaces, a third category of spaces, a fourth category of spaces, a fifth category of spaces, a sixth category of spaces, and a seventh category of spaces, wherein the first category of spaces are blank, and a first deck of game cards, wherein the second category of spaces directs selecting a game card from said first deck of game cards, and a second deck of game cards, wherein the third category of spaces directs selecting a card from said second deck of game cards, and a third deck of game cards, wherein the fourth category of spaces directs selecting a card from said third deck of game cards, and a fourth deck of game cards, wherein the fifth category of spaces directs selecting a card from said fourth deck of game cards, and said sixth category of spaces directs selecting a card from said first deck of game cards, said second deck of game cards, said third deck of game cards, or said fourth deck of game cards, and a plurality of tokens, wherein a token is afforded each player participating in play, and a dice member to direct movement of said tokens about said path, and each of said tokens includes a token base, and the token base includes a token base bottom surface, and the token base bottom surface includes a magnetic base, and the magnetic base includes a first polarity projecting below said magnetic base and said token base, and a token housing, the token housing including a token housing base and a token housing top wall, wherein the token housing further includes a collapsible bellows extending between the base and the top wall, and the token base magnetic base is positioned upon said top wall.

2. An apparatus as set forth in claim 1 wherein the top wall is of a ferrous metallic material, and the token base includes a base magnetic insert positioned within the housing on said token base, and the insert having a second polarity in confrontation to the top wall, and the top wall having an aperture therethrough, whereupon the side wall is collapsed effecting communication of the token base magnetic base with the base magnetic insert, and a seventh category of spaces, wherein the seventh category of spaces directs collapsing of said token housing to effect contiguous communication of the base magnetic insert with the token base magnetic base upon loss of a turn.

* * * * *